US012810323B2

(12) United States Patent
Gerard

(10) Patent No.: US 12,810,323 B2
(45) Date of Patent: Nov. 24, 2026

(54) METHODS AND SYSTEMS FOR ANONYMIZING CONSUMER DATA FOR MODEL TRAINING

(71) Applicant: SheerID, Inc., Portland, OR (US)

(72) Inventor: Rusty Allen Gerard, Bothell, WA (US)

(73) Assignee: SHEERID, INC., Portland, OR (US)

( * ) Notice: Subject to any disclaimer, the term of this patent is extended or adjusted under 35 U.S.C. 154(b) by 415 days.

(21) Appl. No.: 18/458,026

(22) Filed: Aug. 29, 2023

(65) Prior Publication Data

US 2025/0078112 A1 Mar. 6, 2025

(51) Int. Cl.
*G06Q 30/0238* (2023.01)
*G06F 21/60* (2013.01)

(52) U.S. Cl.
CPC ......... *G06Q 30/0238* (2013.01); *G06F 21/60* (2013.01)

(58) Field of Classification Search
None
See application file for complete search history.

(56) References Cited

U.S. PATENT DOCUMENTS 11,847,246 B1 * 12/2023 Rodgers ................ G06F 18/214
11,941,655 B1 * 3/2024 Smaniotto .......... G06Q 30/0202
2006/0077409 A1 * 4/2006 Hoshii ................... H04N 1/628 358/1.9
2008/0244744 A1 * 10/2008 Thomas .............. H04L 63/1425 726/23
2015/0161397 A1 6/2015 Cook et al.
2016/0232159 A1 8/2016 Parikh
2018/0129900 A1 5/2018 Kiraly et al.
2018/0285969 A1 * 10/2018 Busch .................... G06Q 40/03
2019/0268421 A1 * 8/2019 Markuze ................. H04L 67/10
2020/0242466 A1 * 7/2020 Mohassel ............ G06F 21/6254
2021/0056459 A1 * 2/2021 Yerli ...................... G06N 20/20
2021/0150269 A1 5/2021 Choudhury et al.
2021/0264058 A1 8/2021 Junkin et al.
2023/0176888 A1 * 6/2023 Garg .................. G06F 9/45558 718/1

FOREIGN PATENT DOCUMENTS

EP 3955150 A1 2/2022
WO 2020221778 A1 11/2020
WO 2021262868 A1 12/2021

* cited by examiner

*Primary Examiner* — Allan J Woodworth, II
(74) *Attorney, Agent, or Firm* — McCoy Russell LLP

(57) ABSTRACT

Systems and methods are disclosed for anonymizing data for storing and/or using to train an artificial intelligence (AI)/ machine learning (ML) model, such as a model for verifying an identification of a consumer. In one example, when data from a consumer including identifying information of the consumer is received, one or more feature extractors may be applied that transform the data from an input format to a proprietary intermediate digital format that reduces the data to descriptive features not including the identifying information. The reduced data may be inputted into an ML model trained on descriptive features extracted from similar consumer data, and an output of the ML model may be used to determine an eligibility of the consumer for a gated offer.

18 Claims, 6 Drawing Sheets

METHODS AND SYSTEMS FOR ANONYMIZING CONSUMER DATA FOR MODEL TRAINING

FIELD

The present disclosure relates to ID verification systems and methods with anonymized training data to increase data privacy and cyber security.

BACKGROUND AND SUMMARY

An artificial intelligence (AI) model, such as a machine learning (ML) model, may be trained on a corpus of data. The corpus of data may include, for example, a directory/folder of raw input, which may be text, images, etc., and a corresponding flat file (spreadsheet, text file, etc.) or database (relational, NoSQL, etc.) that records "labels" for each data point included in the raw input. One or more parsers may then be implemented to transform the data as desired for a task at hand, for example, to create labeled training data.

In some cases, it may be desirable to train an AI/ML model to evaluate data including sensitive information, such as personal identifying information (PII). For example, the AI/ML model could be trained to verify an identification of a consumer in real time at a point of sale to determine eligibility of the consumer for gated offers. However, legal and/or regulatory guidelines may prohibit storing and processing data including the sensitive information. Removing the sensitive information may be costly and time-consuming.

The current disclosure at least partially addresses one or more of the above identified issues by a method to verify consumer eligibility for gated offers, comprising receiving data from a consumer including identifying information of the consumer; reducing the data to descriptive features, the descriptive features not including the identifying information; evaluating the reduced data using a trained machine-learning (ML) model; and sending an eligibility notification to the consumer based on the result of the evaluation. In contrast to other approaches to removing sensitive information, such as replacing direct identifiers and linked quasi-identifiers in place, the proposed method transforms data including the sensitive information into usable descriptions that do not include the sensitive information, where the descriptions may be inherently useful for training an AI/ML model.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Some embodiments are herein described, by way of example only, with reference to the accompanying drawings, wherein.

DETAILED DESCRIPTION

Figure 1:
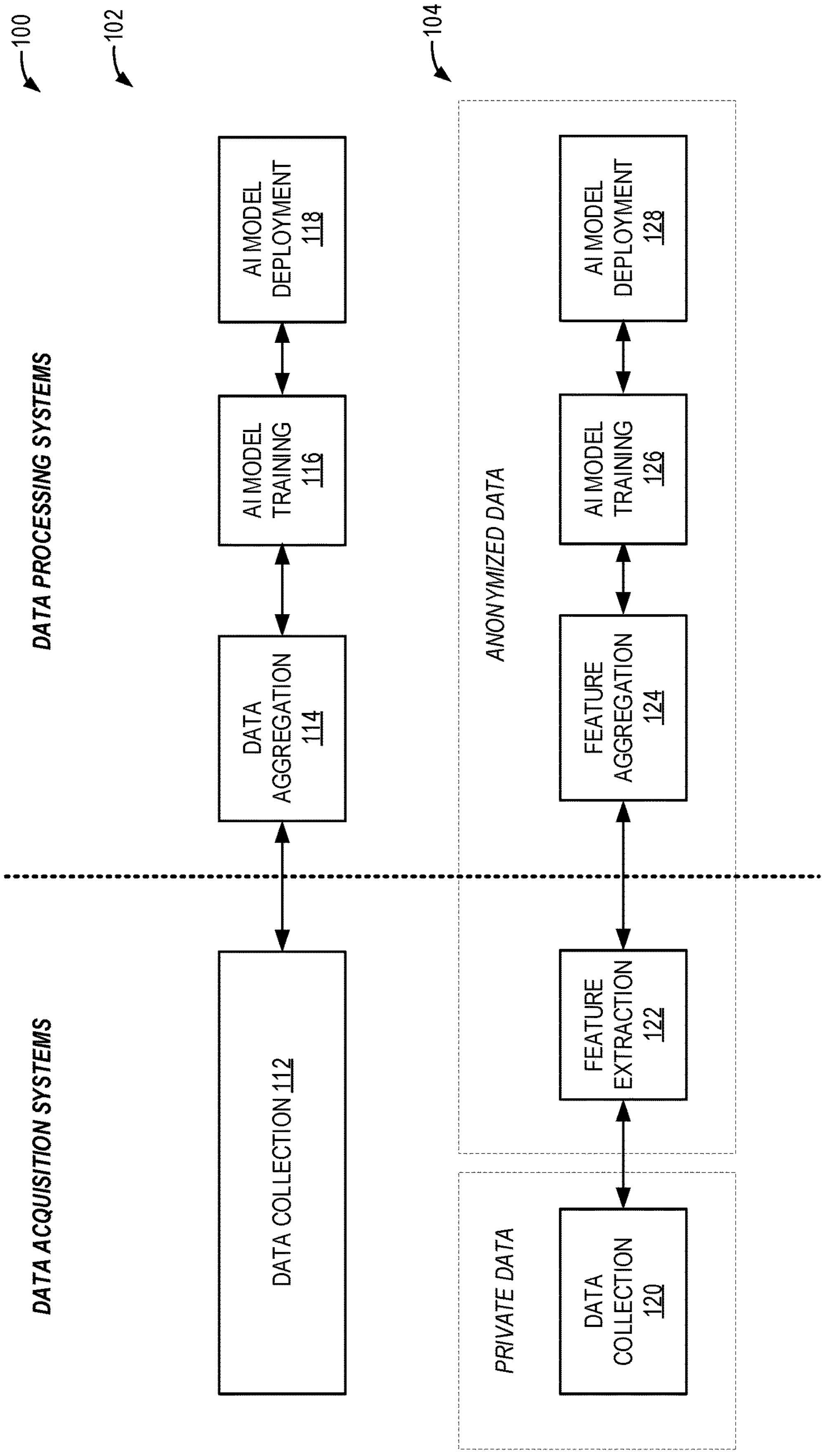
FIG. 1 is a schematic block diagram showing a flow of data during training of an AI/ML model, in accordance with an embodiment of the present disclosure.

The present disclosure relates to methods and systems for transforming data for long-term storage and repeated use in Artificial Intelligence (AI)/Machine Learning (ML) applications, such as classifier/model training, evaluation, etc. in Information Technology (IT) environments. In particular, corporate entities operating on transient end-user data may be subject to compliance around sensitive information, such as personal identifying information (PII), personal credit information (PCI), etc. Such entities may not be able to store end-user data including the sensitive information or transfer the end-user data across public networks. As a result, it may not be feasible to use the end-user data for training an AI/ML model.

A proposed data anonymization system includes one or more "feature extractors" (e.g., software subroutines) that perform an automated task to precompute or transform data from an input format (e.g., plain text files, XML, JSON, images, etc.) to a proprietary intermediate digital format, either compressed or uncompressed, that excludes sensitive data. As these feature extractors are applied to the data, one or more unique IDs may be assigned to features that are extracted from the data that are made available to a user of the data anonymization system to correlate with labels and/or classifications provided by other systems (human decision making, automated systems, pre-existing AI/ML classifiers, etc.) for subsequent use in AI/ML model training, retrospective analysis, etc.). The extracted features and their corresponding pairwise labels may form a corpus of data for ML model training, algorithm parameter tuning, etc. For example, instead of training an artificial neural network (ANN) on input images and labels as is often seen in the literature, the data anonymization system proposed herein may be used to train an ANN or other model on labeled extracted feature data. As another example, the pairwise data may be used to statistically model a performance/effectiveness of an algorithm or other piece of software. For example, a logistic regression on integer word count may be used to distinguish user data as a) tax documents b) proof of identification or c) irrelevant documentation, and an ML model may be used to monitor the efficacy of user interface (UI) software changes instructing the user to upload appropriate types of documents for verification purposes.

This method has several advantages over other alternative methods for anonymizing training data. One advantageous feature of the method disclosed herein is that a dimensionality of the data may be reduced, resulting in a reduction in memory processing resources consumed during processing and storing the data (e.g., fewer floating point operations, less data to transmit and store, etc.) An AI/ML model may be trained on a "shape" of the data, rather than a content of the data. For example, an integer word count may be used rather than a mathematical representation of words for inputting into a neural network for document classification. Additionally, a number and type of features used can be adjusted to fit a specific business demand. For example, a logistic regression on integer word count may be insufficient for document classification in a general sense, but may be sufficient for distinguishing between two or more specific types of documents that may be uploaded to a system for categorization (e.g., tax documents vs proof of identification, etc.). Additionally, in the approach described herein, each feature extractor is evaluated for logical correctness with respect to non-invertibility. In other words, no feature extractor, or combination of feature extractors, can be used to reconstruct PII or PCI data.

Figure 2:
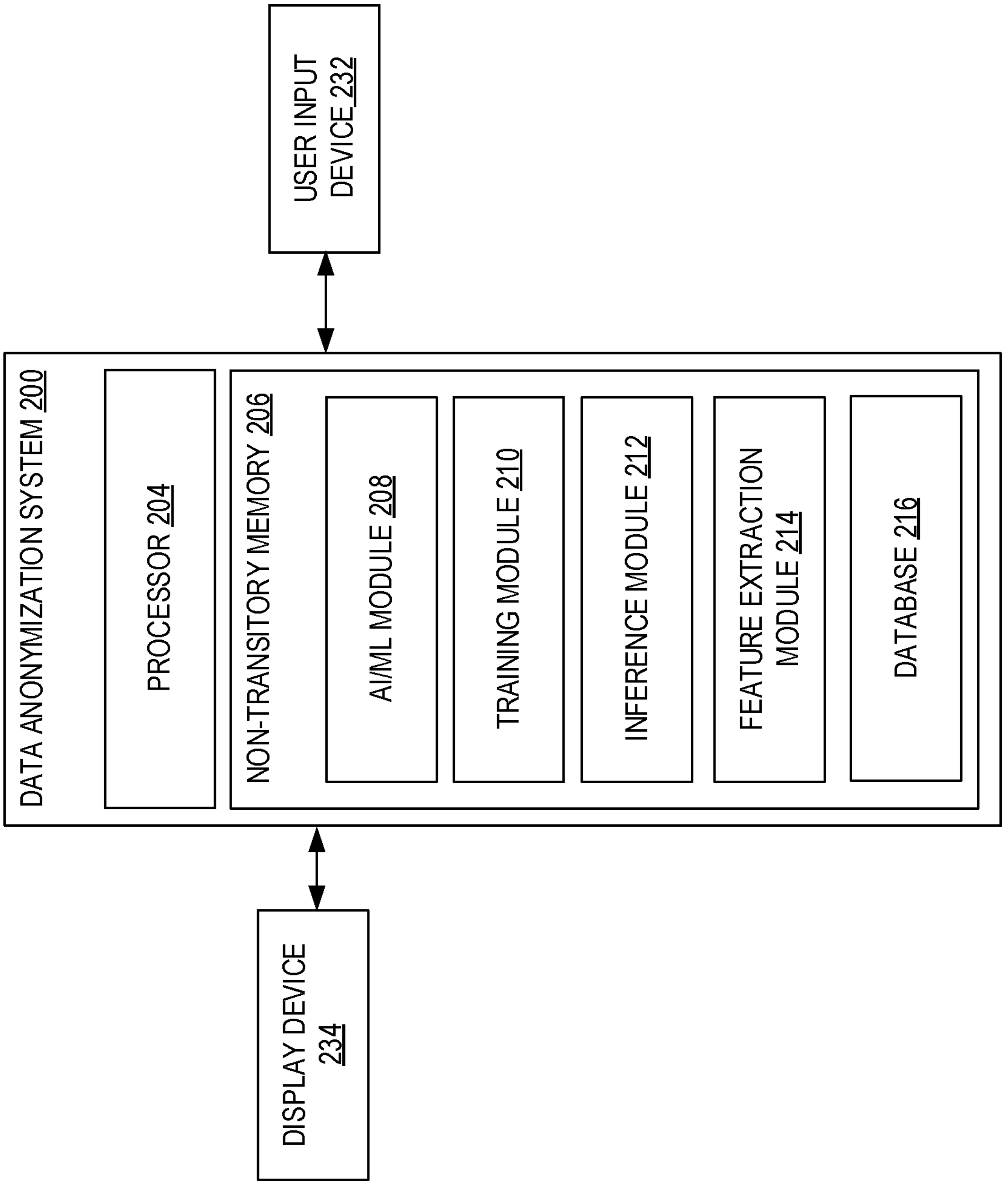
FIG. 2 is a schematic block diagram showing an exemplary data anonymization system, in accordance with an embodiment of the present disclosure.
Figure 3:
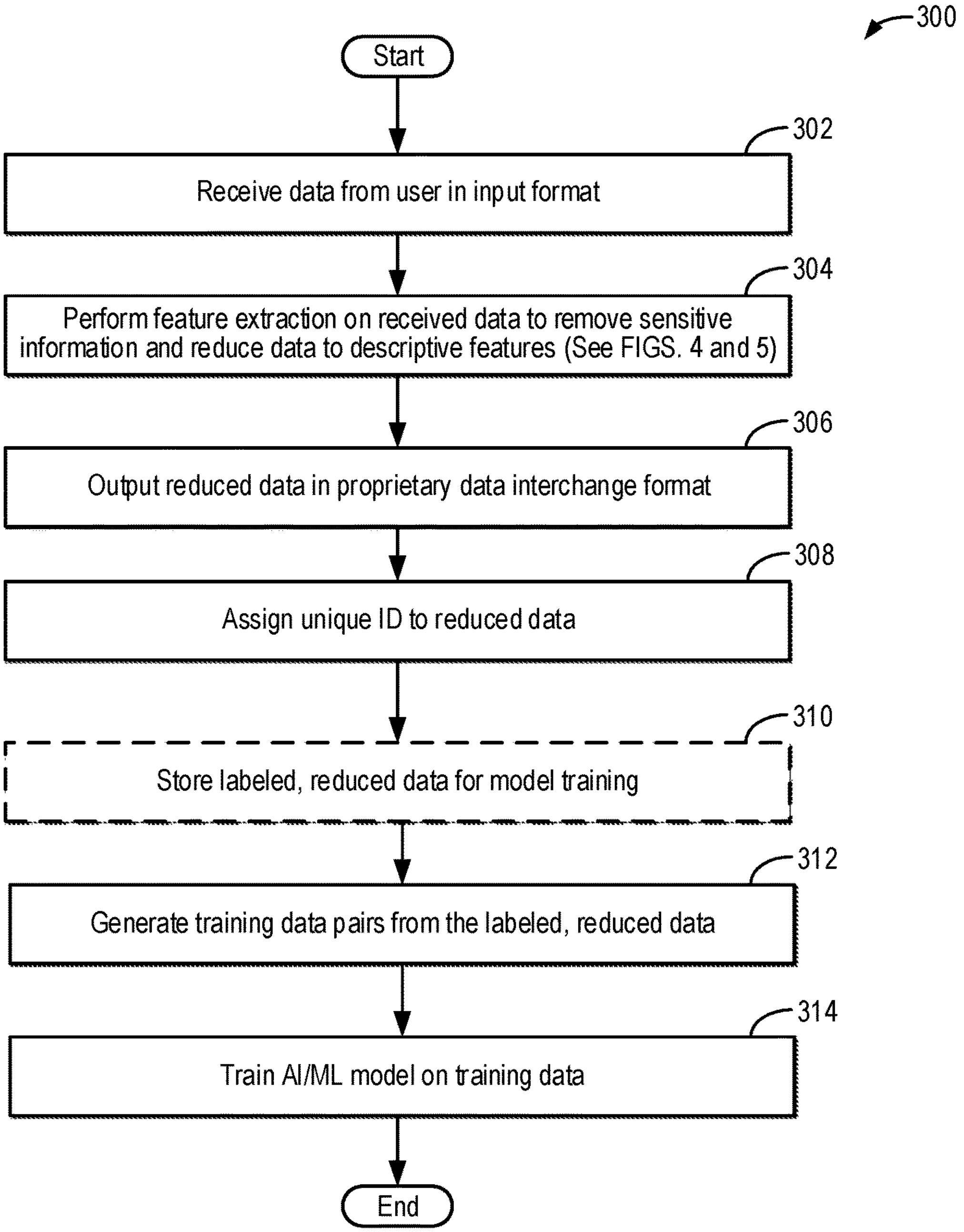
FIG. 3 is a flowchart illustrating an exemplary method for anonymizing data used to train an AI/ML model, in accordance with an embodiment of the present disclosure.

An exemplary data anonymization system is shown in FIG. 2, which may be used to anonymize private data including sensitive information, in accordance with the workflow depicted in FIG. 1. The anonymized data may be used to train an AI/ML model by following one or more steps of the method shown in FIG. 3. For example, the AI/ML model may be trained to classify new private data into two or more categories. The anonymized data may include features extracted from the private data in accordance with various algorithms. A first exemplary algorithm for extracting descriptive features from image data is depicted in the method shown in FIG. 4. A second exemplary algorithm for extracting descriptive features from Internet Protocol (IP) message data is depicted in the method shown in FIG. 5. An exemplary method for using a trained AI/ML model to classify consumers into different consumer categories based on anonymized data and using an AI/ML model trained in accordance with the method of FIG. 3 is shown in FIG. 6.

Turning now to the figures, FIG. 1 schematically shows a workflow diagram 100 including a first workflow 102 and a second workflow 104. First workflow 102 may be a typical workflow for training an AI/ML model. In accordance with first workflow 102, training data is first collected during a data collection process 112. The training data may be collected using diverse systems located in different geographical areas and/or on different data acquisition systems and networks. For example, the training data may include driving data collected by a car company from drivers located in various different regions of one or more countries. A first set of driving data may be collected at a first server hosted in a first region; a second set of driving data may be collected at a second server hosted in a second region; and a third set of driving data may be collected at a third server hosted in a third region. The first, second, and third sets of driving data may not include sensitive information, such as names and/or other personal identifying information of the drivers.

The company may wish to train an AI/ML model, such as a neural network model, to perform a classification task on aggregated driving data collected from the first, second, and third regions. To train the AI/ML model, the driving data collected via data collection process 112 may be sent to a centralized server of the company for processing via one or more data processing systems of the company, via a data aggregation process 114. During data aggregation process 114, the driving data collected from the first, second, and third regions may be aggregated, merged, cleaned, normalized, etc. and stored at the server. A set of training data may then be generated from the aggregated data, which may be used to train the AI/ML model in an AI model training process 116. During AI model training process 116, the AI/ML model may be trained on the training data. In various embodiments, the AI/ML model may be trained using data processing systems available at the server, or transferred to a data processing system on a different server of the company.

Once the AI/ML model is trained, the trained AI/ML model may be deployed in an AI model deployment process 118. For example, during the deployment of the AI/ML model, the trained AI/ML model may be installed at vehicles driving in the first, second, and third regions. The trained AI/ML models installed at the vehicles may perform one or more tasks learned during training of the AI/ML model.

However, first workflow 102 may not be appropriate for other types of collected data, where the collected data includes sensitive information. As used herein, sensitive information includes personal identifying information (PII), personal credit information (PCI), and/or other types of sensitive information. For example, the car company may wish to process consumer information collected at the first, second, and third regions, where the consumer information includes identifying information. The consumer information may be collected at the data acquisition systems during data collection process 112, but the consumer information may be prohibited from being stored by the data acquisition systems and the data processing systems. The consumer information may also be prohibited from being transmitted from the data acquisition systems to the data processing systems for data aggregation process 114.

As a result, to train the AI/ML model at AI model training process 116, the sensitive information must first be removed from the collected data. Removing the sensitive information from the collected data may be time consuming and laborious. However, removing sensitive data is important for several reasons. AI/ML systems need to be trained on data that is representative of a population that the system will be applied to, and simple random samples are a preferred method for obtaining that data. If disparate data (e.g. real data obtained from a source other than the consumers of the business) or synthetic data is used, then the AI/ML system may underperform or otherwise be in error when applied to the real population (actual consumers), which has numerous cost implications for the business (loss of revenue, wasted expenditures, etc.). Having a corpus of data allows technical personnel (engineers, scientists) to produce new AI/ML models on demand, and refine those models at-will as new data becomes available. The more comprehensive and verbose that data is, the better (from a business perspective). The original, "raw" consumer data would be ideal from a technical perspective, but is legally prohibited in practice.

An alternative approach could be to use what is known as "continual learning" where an AI/ML model is continually learning and improving itself using a stream of "raw" data and reinforcement feedback provided by the business. However, a downside to this approach from a business perspective is that if the system gets trapped in a local maxima, it may be difficult to repair the system without reverting to a prior state (a "backup"). For this reason, continual learning systems are a liability from a business perspective, because they can become irreparably broken without constant observation and maintenance by technical personnel.

Once the sensitive information is removed from the collected data, the anonymized collected data may be sent to the data processing systems for data aggregation process 114 and model training process 116. Once the AI/ML model is trained, the trained AI/ML model may be deployed at model deployment process 118, where the trained AI/ML model may be used to identify relationships in the anonymized collected data, which may be exploited by the company.

Second workflow 104 depicts a proposed procedure for anonymizing collected data with sensitive information, such as the consumer data described above, to be transmitted, stored and processed at data processing systems of the company. The private data may be collected during a data collection process 120, which may be the same as or similar to the data collection process 112 of first workflow 102. In contrast to first workflow 102, a proposed feature extraction process 122 is performed on the collected data, to extract features of the collected data. The extracted features do not include the sensitive information. However, the extracted features may preserve relationships, or include a codification or representation of relationships detected in the private data. The extracted features may include one or more identification (ID) codes associated with aspects of the sensitive data (e.g., consumer identifying information), which may facilitate labeling the collected data for training purposes.

The extracted features may then be sent to the data processing systems of the company for a feature aggregation process 124. During feature aggregation process 124, features extracted from the first, second, and third regions may be aggregated and stored for further processing. During an AI model training process 126, an AI/ML model may be trained, for example, to perform a classification task on the labeled extracted features, rather than on the collected data.

Once the AI/ML model has been trained, the trained AI/ML model may be deployed via an AI model deployment process 128, to be used in an inference stage. For example, during the inference stage, the trained AI/ML model may be used to categorize potential car consumers into different categories for targeting with gated offers, as part of a marketing strategy of the company. During the inference stage, new consumer data may be collected; features may be extracted from the new consumer data, in accordance with the feature extraction process 122; the extracted features may be inputted into the trained AI/ML model, which may classify the extracted features. After classification by the trained AI/ML model, the ID codes assigned to the extracted features may be used to reference the consumers associated with the extracted features for targeting with the gated offers.

In this way, a consumer classification task may be substituted with a feature classification task that produces similar classifications, without relying on consumer identifying information. In other words, a first set of consumer classifications outputted by the trained AI/ML model based on the extracted features may be substantially similar to a second set of consumer classification data outputted by a different trained AI/ML model trained on the consumer data. Additionally, because a size of the extracted feature data may be smaller than a size of the consumer data (e.g., where the extracted feature data is a compressed representation of the consumer data), an amount of memory and processing resources consumed during AI model training process 126 and AI model deployment process 128 may be reduced, with respect to AI model training process 116 and AI model deployment process 118 of workflow 102. The reduction in the use of the memory and processing resources may increase a performance and functioning of the data processing systems referred to in FIG. 1.

FIG. 2 shows a data anonymization system 200, in accordance with an embodiment. In some embodiments, at least a portion of data anonymization system 200 is disposed at a separate device (e.g., a workstation) which can receive images, text, and/or other types of data from various computing systems or storage devices that store the data generated by the various computing systems.

Data anonymization system 200 may be operably/communicatively coupled to a user input device 232 and a display device 234. In some embodiments, user input device 232 may comprise a user interface of the various computing systems, while display device 234 may comprise a display device of the various computing systems, at least in some examples.

Data anonymization system 200 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store an AI/ML module 208. AI/ML module 208 may include one or more AI/ML models, and instructions for implementing the one or more AI/ML models to process data received by data anonymization system 200, as described in greater detail below. As described herein, the AI/ML models include AI, ML, deep learning (DL), and/or other neural network models, such as convolutional neural networks (CNN), recurrent neural networks (RNN), generative adversarial networks (GAN), and/or other types of neural network models. AI/ML module 208 may include trained and/or untrained neural networks and may further include various data, or metadata pertaining to the one or more neural networks stored therein.

Non-transitory memory 206 may further store a training module 210, which may comprise instructions for training one or more of the AI/ML models stored in AI/ML module 208. Training module 210 may include instructions that, when executed by processor 204, cause data anonymization system 200 to conduct one or more of the steps of method 300 for training an AI/ML model, discussed in more detail below in reference to FIG. 3. In some embodiments, training module 210 may include instructions for implementing one or more gradient descent algorithms, applying one or more loss functions, and/or training routines, for use in adjusting parameters of the one or more AI/ML model of AI/ML module 208. Training module 210 may include training datasets for the one or more AI/ML models of AI/ML module 208.

Non-transitory memory 206 also stores an inference module 212. Inference module 212 may include instructions for deploying a trained AI/ML model of the one or more AI/ML models in various scenarios, such as the exemplary scenarios described in reference to FIGS. 4 and 5. In particular, inference module 212 may include instructions that, when executed by processor 204, cause data anonymization system 200 to conduct one or more of the steps of the methods 400 and 500 of FIGS. 4 and 5 respectively.

Non-transitory memory 206 further stores a feature extraction module 214. Feature extraction module 214 may include instructions for extracting features from data received by data anonymization system 200. The extracted features may be used to train the one or more AI/ML models, in scenarios where storing, processing, transmitting, and/or using the received data for model training may be prohibited due to the inclusion of sensitive information (e.g., PII, PCI, etc.) in the received data. The extracted features may not include the sensitive information, whereby the extracted features may be stored, processed, transmitted, and/or used to train the one or more AI/ML models. The extracted features may capture patterns in the received data, which may be exploited by an AI/ML model of the one or more AI/ML models to generate an output that is similar to an output generated from a same or similar AI/ML model trained on the received data.

Non-transitory memory 206 further stores a database 216. Database 216 may include data in various formats including, for example, two-dimensional (2-D) or three-dimensional (3-D) images, text, audio or video data, digital signal data, and the like. For example, database 216 may store data received at data anonymization system 200 from one or more other computing systems, data generated as a result of processing performed on the received data by data anonymization system 200, in particular by feature extraction module 214, and/or data outputted by one or more AI/ML models of data anonymization system 200.

In some embodiments, non-transitory memory 206 may include components disposed at two or more devices, which may be remotely located and/or configured for coordinated processing. In some embodiments, one or more aspects of non-transitory memory 206 may include remotely-accessible networked storage devices configured in a cloud computing configuration.

User input device 232 may comprise one or more of a touchscreen, a keyboard, a mouse, a trackpad, a motion sensing camera, or other device configured to enable a user to interact with and manipulate data within data anonymization system 200. In one example, user input device 232 may enable a user to make a selection of data to use in training an AI/ML model, or for further processing using a trained AI/ML model.

Display device 234 may include one or more display devices utilizing virtually any type of technology. In some embodiments, display device 234 may comprise a computer monitor. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view data generated by data anonymization system 200, and/or interact with various data stored in non-transitory memory 206.

It should be understood that data anonymization system 200 shown in FIG. 2 is for illustration, not for limitation. Another appropriate system may include more, fewer, or different components.

Referring now to FIG. 3, a flowchart is shown of a method 300 for training an AI/ML model using data that has been anonymized using feature extraction via a data anonymization system such as data anonymization system 200 of FIG. 2. Method 300 may be executed by a processor of data anonymization system, such as the processor 204 of FIG. 2. Operations of method 300 may be stored in a non-transitory memory of the computing system, such as in AI/ML module 208, training module 210, and/or feature extraction module 214 of FIG. 2.

Method 300 starts at 302, where the method includes receiving data from a user of the data anonymization system. The data may include text, images, video, audio files and/or other types of data in various formats. For example, text data may include plain text files, HTML files, XML files, JavaScript Object Notation (JSON) files, binary files, and/or files generated using a different markup language; or a different type of text file.

At 304, method 300 includes performing a feature extraction process on the received data to remove sensitive information and reduce the received data to descriptive features. The feature extraction process may rely on various different feature extraction algorithms, and the types of features extracted from the received data may differ depending on the type or format of the received data. During the feature extraction process, one or more feature extractors may be applied to the received data, where the feature extractors are subroutines that implement the feature extraction algorithms.

Features may be selected for extraction using an iterative process of software implementation and statistical modeling to identify data that is exploitable by a business. Software implementation relies on characterizing a type of user data (text, image, video, etc.), and common yet distinctive patterns in that data (for example, a number of paragraph breaks in a document). After implementing the feature extractor, a performance of the feature extractor is modeled to determine its efficacy on user data (modality, accuracy as estimated by a human labeler, accuracy as estimated by another AI/ML system trained on voluntary user data, etc.). Exemplary feature extraction processes are described in greater detail in relation to FIGS. 4 and 5 below.

In particular, an advantage of the feature extraction process disclosed herein is that it is non-invertible, meaning that the received data and the sensitive information included in the received data cannot be obtained from the extracted features. In other words, mathematically speaking, if the feature extraction is described by a hypothetical function of the received data, no inverse function exists by which the received data may be obtained from the extracted features.

For example, let x denote the end-user data (text, image, etc.), let f denote a feature extractor, let y denote the intermediate data useful for input into other software used for AI/ML training, evaluation, etc. such that f(x)=y. Furthermore, let f^−1 denote the mathematical inverse of f. Each feature extractor f is designed so that no inverse function exists, i.e. f^−1(y)=x is mathematically impossible to solve.

At 306, method 300 includes outputting a reduced set of data, based on the extracted features, in a proprietary data interchange format. Numerical data may be encoded as bytes in either big- or little-endian format, with the order of those bytes and the number of bytes per number either known by the software, or defined as a preamble or "header information". The bytes may be interpretable as ASCII, UTF-8 or a similar text encoding scheme, or as integers, so that the preamble informs the software how to interpret the data, or as byte sequences delimited by a sentinel byte sequence known to the software but not able to occur in the sequenced data itself. Alternatively, a non-proprietary data interchange format may be used for interoperability with other software components. The data interchange formats include but are not limited to JSON and XML.

At 308, method 300 includes assigning an ID to the reduced data. The ID may be a unique ID. The ID may be used to correlate descriptive features of the reduced data with ground truth labels stored in a file or database (e.g., database 216). Examples of unique IDs include but are not limited to: monotonically increasing integers, Universally Unique Identifiers (UUIDs), Globally Unique Identifiers (GUIDs), relational database primary keys, NoSQL database object IDs, etc.

At 310, method 300 optionally includes storing the labeled, reduced data, for example, for future use in training an AI/ML model. In other words, the received data in the input format may be prohibited from being stored, due to the inclusion of sensitive information. By performing the feature extraction, aspects of the received data useful for training the AI/ML model may be retained, where the aspects do not include the sensitive information. The aspects may include, for example, relationships between elements of the data, patterns detected in the data, comparative statistics of elements of the data, etc.

At 312, method 300 includes generating a set of training data pairs from the labeled, reduced data. Generating a set of training data pairs may include extracting data elements of the reduced data (e.g., the extracted features) and associated labels, where each training data pair of the training data pairs may include a data element as input data, and the associated label as ground truth data. The labels may be associated with the extracted features using the IDs assigned to the extracted features.

When carrying out the training using the IDs, labels may be assigned using various methods, including but not limited to random sampling and subsequent human operator inspection; automatic monitoring of software system behavior correlated with a data point (network TCP/IP traffic, server CPU load, eventual related customer support inquiry, etc.); clustering data according to similarity metrics (k-means, K-medoids, Clustering Large Applications (CLARA), etc.), for the purpose of assigning machine-generated labels or identifiers so that future data can be predicted according to the machine-generated label, where human interpretability of the data is not a requirement (for example, for the purpose of routing data to appropriate processing systems which may have monetary implications for their processing); clustering data according to aforementioned similarity metrics as an intermediate step for subsequent aforementioned human operator inspection, or a different method.

During training, an AI/ML model may be used to map the input data to the ground truth (e.g., target) data. For example, the AI/ML model may be a classification model, and the ground truth data may indicate a classification of the input data. However, it should be appreciated that while the training of the AI/ML model is described herein in reference to a classification model, the systems and methods described herein may relate to other types of AI/ML models that rely on different types of input data and ground truth data and/or perform different types of tasks without departing from the scope of this disclosure.

At 314, method 300 includes training the AI/ML model on the training data pairs. As one example, the AI/ML model may be a neural network including one or more layers. Each layer may comprise a plurality of weights, wherein the values of the weights are learned during a training procedure. Training the neural network may include iteratively inputting input data of each training image pair into an input layer of the neural network. The neural network propagates the input image data from the input layer, through one or more hidden layers, until reaching an output layer of the neural network.

The neural network may be configured to iteratively adjust one or more of the plurality of weights of the neural network in order to minimize a loss function, based on a difference between an output of the neural network and the ground truth data of the training data pair. The difference (or loss), as determined by the loss function, may be back-propagated through the network to update the weights (and biases) of the hidden layers. In some embodiments, back propagation of the loss may occur according to a gradient descent algorithm, wherein a gradient of the loss function (a first derivative, or approximation of the first derivative) is determined for each weight and bias of the neural network. Each weight (and bias) of the neural network is then updated by adding the negative of the product of the gradient determined (or approximated) for the weight (or bias) with a predetermined step size. Updating of the weights and biases may be repeated until the weights and biases of the neural network converge, or the rate of change of the weights and/or biases of the neural network for each iteration of weight adjustment are under a threshold. After the neural network is trained and validated, the trained neural network may be stored in a memory of the data anonymization system (e.g., in inference module 212 of FIG. 2), and used to classify new input data. Use of the trained AI/ML model is described in greater detail below in relation to FIG. 6.

Figure 4:
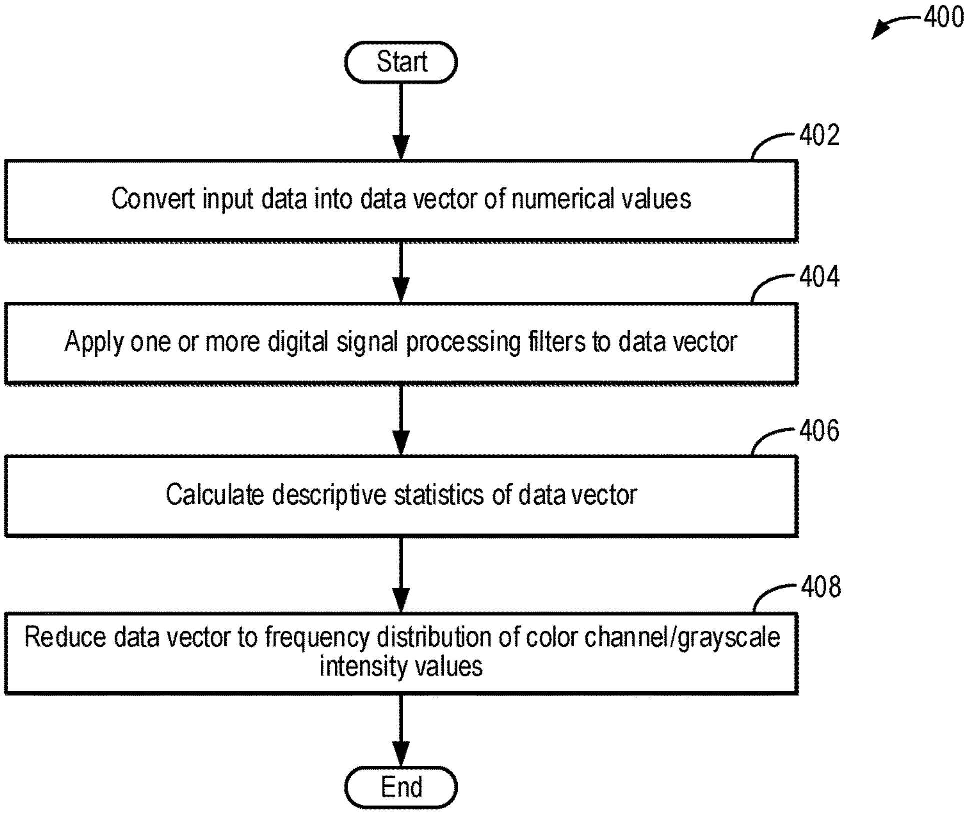
FIG. 4 is a flowchart illustrating an exemplary method for training an AI/ML model using extracted features obtained by applying one or more digital signal processing filters, in accordance with an embodiment of the present disclosure.

Referring now to FIG. 4, a flowchart is shown of an exemplary method 400 for extracting descriptive features of received image data to generate a reduced, anonymized dataset for training an AI/ML model to process the image data. For example, processing the image data may include detecting one or more patterns in the image data, or classifying the image data into two or more categories. Method 400 may be performed by a data anonymization system, such as data anonymization system 200 of FIG. 2. In particular, method 400 may be executed by a processor of the data anonymization system, such as processor 204 of FIG. 2. Operations of method 400 may be stored in a non-transitory memory of the computing system, such as in AI/ML module 208, training module 210, and/or feature extraction module 214 of FIG. 2. It should be appreciated that in some embodiments, one or more steps of method 400 may be performed in a different order without departing from the scope of this disclosure.

Method 400 starts at 402, where the method includes converting input image data into a data vector of numerical values. For example, the input image data may include a rasterized RGB image, such as a JPEG, GIF, BMP, etc. The input image data may include a document comprised of images and/or text which is then rasterized, such as a PDF, DOC, RTF, etc. It should be appreciated that the examples provided herein are for illustrative purposes, and the input image data may comprise other types of images without departing from the scope of this disclosure.

The data vector may be a one-dimensional vector, or multi-dimensional matrix of numerical values. In some embodiments, the numerical values may be normalized values between 0 and 1. In one embodiment, the numerical values may be binary values (e.g., 0s or 1s). For example, the input image data may include a 2-D digital color image, where the input image data comprises three 2-D arrays of pixel intensity values in red, green, and blue color channels. The three 2-D arrays of pixel intensity values may be converted into a 3-D data vector, where each numerical value of the 3-D data vector corresponds to a pixel intensity value of a respective red, green, or blue color channel of the three 2-D arrays. Alternatively, derived color channels (e.g. grayscale intensity) may be used.

At 404, method 400 includes applying one or more digital signal processing filters to the data vector. Various types of digital signal processing filters may be applied. For example, a low-pass filter, a high-pass filter, and/or a band-pass filter may be applied to the data vector. In another embodiment, a convolution kernel may be applied to the data vector.

Applying digital signal processing filters are advantageous for a number of reasons, including but not limited to dimensionality reduction (e.g. transforming mathematical Real numbers or integers into Boolean true/false values, etc.); data pre-processing or "cleaning" to reduce the number of outliers or otherwise spurious measurements in a datum; data pre-processing to force the AI/ML model training to ignore specific signals in the data (either to train secondary or tertiary models after a primary model has been trained, or to simplify the training process); and so on.

At 406, method 400 includes calculating descriptive statistics of the data vector. The descriptive statistics include, for example, mean and/or median values of the data vector, a mathematical mode of the data vector (e.g., the most common number in a set of data values), relative frequencies of the data vector, etc.

At 408, method 400 includes reducing the data vector to frequency distribution of intensity values for each color channel (red, green, blue; cyan, magenta, yellow, black, etc.), as well as for derived color channels (e.g. grayscale intensity values). In some embodiments, given a rasterized digital image (e.g., a JPEG, PNG, TIFF, etc. file generated by a digital camera, scanner, or rendering software) of dimensions X. Y (X pixels wide, Y pixels tall), with each pixel comprised of one or more color channels (e.g. red, green, blue; cyan, magenta, yellow, black; etc.), with each discrete measurement having a range of possible values B (0-255 inclusive, 0-1023 inclusive, etc.) sometimes referred to as the "color depth" or "bit depth" of the image. The X-by-Y pixel values may be converted into one or more frequency distributions stored in vectors of size B. For example, a common "1 megapixel" digital camera might produce a rasterized image of 1366×768 pixels, with each pixel being an RGB triplet in the range [0-255, 0-255, 0-255].

The embodiment then generates the desired frequency distribution(s), with each discrete measurement in the resulting distribution(s) equaling the frequency of a pixel color value (e.g., intensity) corresponding to the relative element of the frequency distribution. One or more mathematical vector(s) of 256 measurements each may be created, with each measurement in the range 0-1049088 inclusive (1366×768=1049088), and the sum of those measurements equaling 1049088. Optionally, the embodiment may then compute the relative frequency by dividing each integer measurement by 1049088, to produce real numbers in the range of 0-1 inclusive, with a total sum equaling 1. It can be shown that the "bit depth" and dimensions of input images can vary independently from the output frequency distributions, such that every frequency distribution output is of the same dimensions and possible range of values. The exemplary frequency distribution uses 256 values, for illustrative purposes.

Further transformations may be applied to the data, such as a high-pass filter (e.g. to identify the frequency of exceptionally bright pixels); a low-pass filter (e.g. to identify the frequency of exceptionally dark pixels); a band-pass filter (e.g. to identify the frequency of "expected" pixels); convolution kernels to "smooth" the frequency distribution and reduce noise in the measurements; counting the number of peaks or valleys in the visual plot of the distributions (with or without first applying one or more convolution kernels); and the like.

In various embodiments of a feature extractor, the Red, Green, Blue, and Grayscale relative frequency distributions of each input may be converted into a single vector of 4 measurements, with each measurement corresponding to a frequency count of the number of pixels that were accepted by the aforementioned high/low/band-pass filter in each color channel, or the number of peaks or valleys in the visual plot of the distributions, etc. These derived features provide a number of advantages, including relying on relatively few floating point operations to compute compared to CNNs or other technologies. Decisions made by AI/ML systems trained on the derived features are readily interpretable by personnel. For example, in an embodiment of a system that trains an AI/ML model to identify photographs as either "authentic" or "inauthentic" using one or more of the aforementioned feature extractor embodiments, training of the AI/ML model may include collecting a set of labeled feature pairs, where each feature is assigned an ID, and that ID is traced through business processes to directly or indirectly infer authenticity, either by human personnel flagging a transaction as inauthentic, or another automated system.

Figure 5:
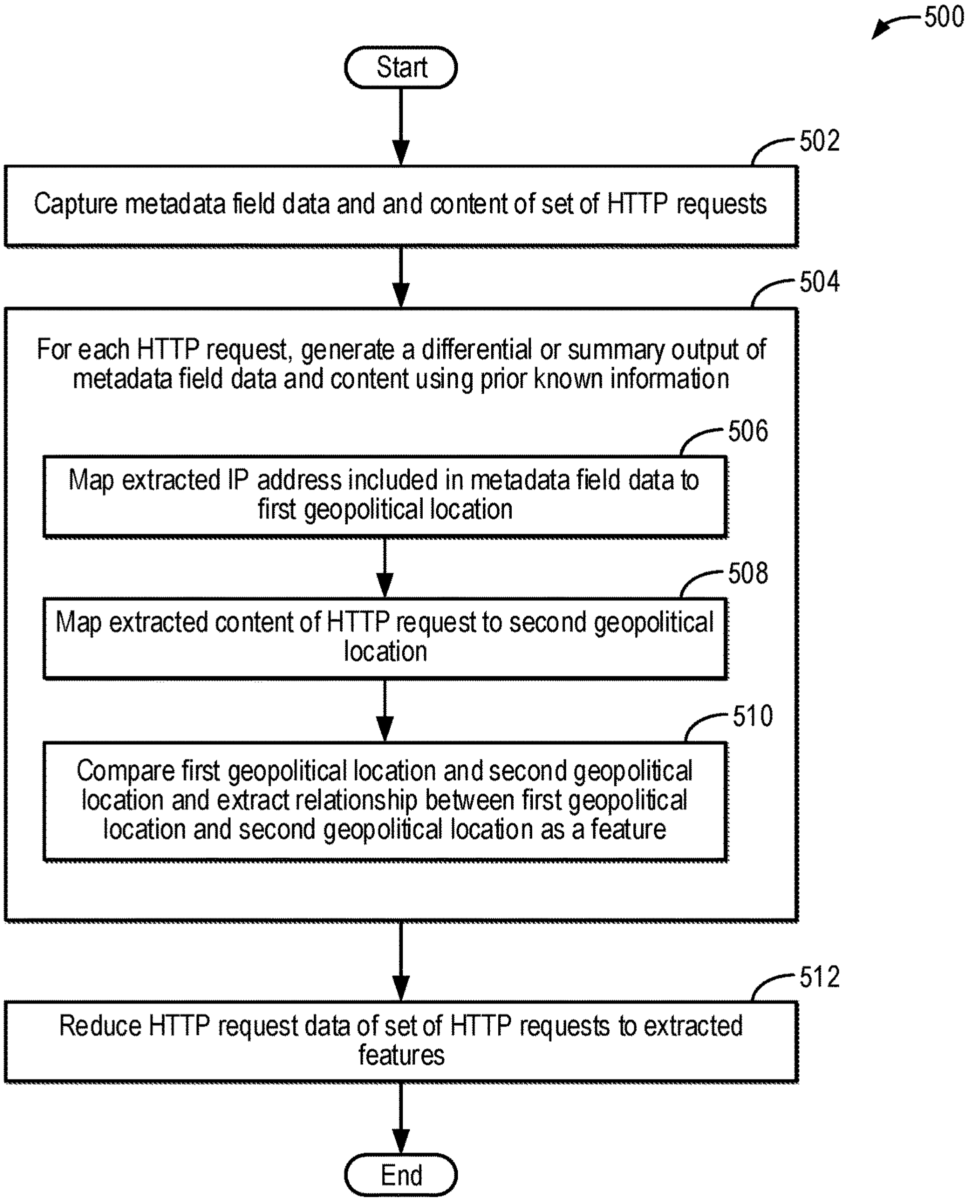
FIG. 5 is a flowchart illustrating an exemplary method for training an AI/ML model using extracted features obtained by processing one or more metadata fields included in an Internet Protocol message, in accordance with an embodiment of the present disclosure.
Figure 6:
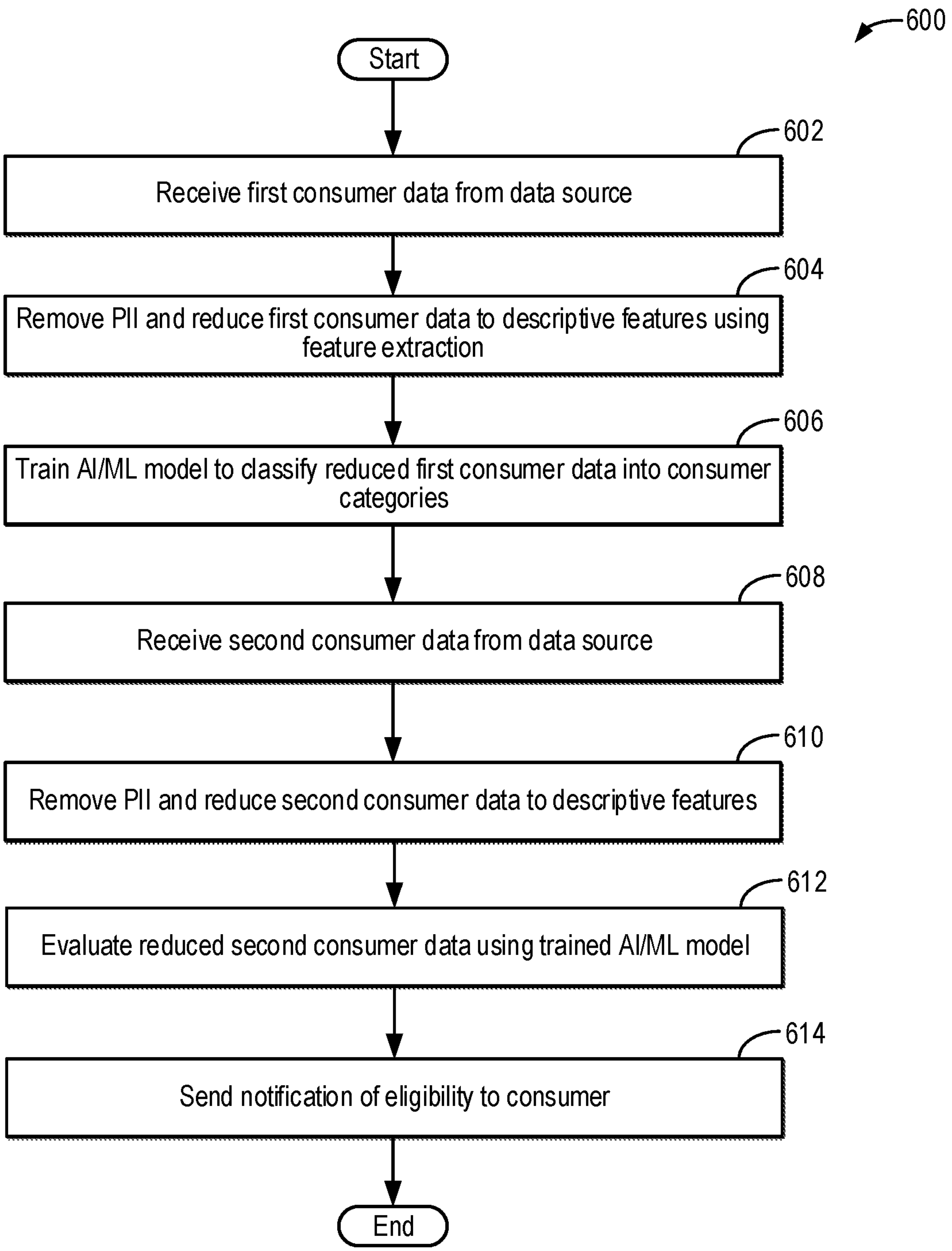
FIG. 6 is a flowchart illustrating an exemplary method for classifying consumer data including sensitive information using an AI/ML model trained on anonymized data, in accordance with an embodiment of the present disclosure.

Referring now to FIG. 5, an exemplary method 500 is shown for extracting features of received Internet Protocol (IP) messages to generate a reduced, anonymized dataset for training an AI/ML model to process the IP messages. In method 500, the received IP messages are Hypertext Transfer Protocol (HTTP) requests. However, in other embodiments, the received IP messages may include other types of IP messages, such as Extensible Messaging and Presence Protocol (XMPP) messages, or a different type of IP messages. In one embodiment, processing the IP messages may include classifying the IP messages into two or more categories. For example, an eligibility of a consumer for a promotional offer can be estimated by AI/ML using anonymized data of prior consumer transactions. Method 500 may be performed by a data anonymization system, such as data anonymization system 200 of FIG. 2. In particular, method 500 may be executed by a processor of the data anonymization system, such as the processor 204 of FIG. 2. Operations of method 500 may be stored in a non-transitory memory of the computing system, such as in AI/ML module 208, training module 210, and/or feature extraction module 214 of FIG. 2.

Method 500 starts at 502, where the method includes capturing data from a set of received HTTP requests. The captured data may include a content of each of the HTTP requests, which may include plain text, an HTML form, etc. The captured data may also include data included in various fields of the HTTP requests. The captured data may include metadata generated by a software agent included in one or more metadata fields of each of the HTTP requests.

At 504, method 500 includes generating a differential or summary output of data elements included in two or more fields of the IP message using prior known information. The prior known information may include information retrieved from precomputed lookup tables, public databases, public registries, etc. For example, generating the differential or summary output of the data elements included in the two or more fields of the IP message may include determining a relationship between a first data element included in a metadata field of the IP message, and a second data element included in a message field of the IP message. The relationship may be a feature extracted from the IP message.

At 506, generating the differential or summary output of the metadata field data and the content of an HTTP request using the prior known information includes mapping an IP address extracted from the HTTP request to a first geopolitical location. For the purposes of this disclosure, a geopolitical location may be a state, country, province, etc. The first geopolitical location may be determined by looking up the extracted IP address using a public service or consulting a public database.

At 508, generating the differential or summary output of the metadata field data and the content of the HTTP request using the prior known information includes mapping the extracted content of the HTTP request to a second geopolitical location. The second geopolitical location may be stated in the content of the HTTP request, or the second geopolitical location may be implied by the content of the HTTP request. The second geopolitical location may be inferred in various ways, such as, for example, determining a target location for a promotional offer by a business (e.g., a service provider, retailer, etc.); by identifying a geopolitical location(s) of organizations matching criteria specified by the aforementioned business; by identifying one or more geopolitical location(s) directly or indirectly specified in the HTTP request; and so on.

At 510, generating the differential or summary output of the metadata field data and the content of the HTTP request using the prior known information includes comparing the first geopolitical location to the second geopolitical location, and extracting a relationship between the first geopolitical location and the second geopolitical location as a feature. In one embodiment, the extracted relationship between the first geopolitical location and the second geopolitical location may include a physical distance between the first geopolitical location and the second geopolitical location using a standard unit of measurement (meters, miles, etc.). In this way, the data of an individual HTTP request may be reduced to a distance measurement, and the collective data of the set of HTTP requests (also referred to herein as the original HTTP request data) may be reduced to a set of distance measurements.

By reducing the set of HTTP requests to the set of distance measurements, sensitive information included in the set of HTTP requests, such as names and/or other identifying information of individuals, may be removed from the reduced HTTP request data (also referred to herein as the reduced data). As a result, the reduced data may be stored, transmitted, and/or processed in compliance with legal guidelines and regulations. The reduced data thus includes a compressed representation of the original HTTP request data that may be sufficient for training an AI/ML model to identify patterns in the reduced data that correspond to similar patterns in the original HTTP request data. In this way, the AI/ML model may be used to perform a task based on the identified patterns in the reduced data with a level of performance similar to performing the task using the original HTTP request data as input.

For example, a promotional offer may be valid for consumers physically present at a retail location while making a purchase, and not valid for consumers who are not physically present at the retail location. This method is advantageous because it does not rely on dedicated positioning data such as GPS, or independent verification of the consumer's whereabouts while restricting access to the promotional offer.

An additional advantage of reducing the set of HTTP requests to the set of distance measurements is that an overall size of the reduced HTTP request data may be significantly smaller than a size of the original HTTP data prior to performing the feature extraction. As a result, a first amount of memory consumed by the data anonymization system in storing the reduced HTTP request data (e.g., in database 216 of non-transitory memory 206 of FIG. 2) may be less than a second amount of memory consumed in storing the original HTTP request data. Because an amount of training data used to train an AI/ML model may be large, by storing training data comprising the reduced HTTP request data rather than storing training data comprising the original HTTP request data, an amount of non-transitory memory of the data anonymization system may be freed up to be used by other tasks performed by the data anonymization system, thereby increasing an overall performance and improving a functioning of the data anonymization system with respect to an alternate scenario where the original HTTP request data is stored. Similarly, an amount of processing (e.g., computation) performed during training of the AI/ML model may be reduced as a result of training the AI/ML model on the reduced HTTP request data rather than training the AI/ML model on the original HTTP request data, resulting in further increases in performance and functioning of the data anonymization system.

Referring now to FIG. 6, an exemplary method 600 is shown for an end-to-end procedure for processing consumer data including sensitive information (e.g., PII, PCI, etc.), where the consumer data is anonymized prior to processing using a data anonymization system such as data anonymization system 200 of FIG. 2. In one embodiment, the consumer data may be used by a company to classify consumers included in the consumer data into two or more categories, for example, for targeting with gated offers, or for a different purpose, in accordance with a marketing strategy of the company. It should be appreciated that while the example of FIG. 6 focuses on processing consumer data, the steps of method 600 may be applied to other types of data to perform different types of tasks.

The consumer data may be processed by an AI/ML model stored in a memory of the data anonymization system (e.g., in AI/ML module 208). Processing the consumer data using the AI/ML model may include first training the AI/ML model on a first set of anonymized consumer data, and then using the trained AI/ML model to process a second set of anonymized consumer data. Method 600 may be executed by a processor of data anonymization system, such as the processor 204 of FIG. 2. Operations of method 600 may be stored in a non-transitory memory of the computing system, such as in non-transitory memory 206 of FIG. 2.

Method 600 starts at 602, where the method includes receiving a first set of consumer data from a data source. The consumer data described in reference to method 600 may include data relevant to consumer habits, spending habits, buying patterns, or other consumer data relevant to products or services provided by the company and/or the marketing strategy of the company. For example, the consumer data may include data collected from one or more websites, including current and past purchasing data, affiliation data, socio-economic and/or demographic data, and the like. The consumer data may include data in various formats, including text, images, video, audio, etc. The consumer data may include names and/or other identifying information of previous customers or clients of the company and/or potential new customers or clients. The consumer data may also include credit and/or other financial information of previous or potential new customers and/or clients. As a result of including the identifying information and/or financial/credit information, the consumer data may be prohibited from being stored in a memory of a computing device (e.g., server) of the company. As such, the consumer data may be transient data that cannot be processed without first removing the identifying information and/or financial/credit information.

At 604, method 600 includes performing a first feature extraction process on the first set of consumer data to remove sensitive information and reduce the first set of consumer data to descriptive features. The first feature extraction process may be the same as or similar to the feature extraction process described above in relation to methods 300, 400, and 500 of FIGS. 3, 4, and 5, respectively. As a result of applying the first feature extraction process to the first set of consumer data, a first reduced set of consumer data may be generated including the extracted features. The first reduced set of consumer data may not include the sensitive information. However, the first reduced set of consumer data may include relationships or patterns between elements of data of the first reduced set of consumer data that also exist in data elements of the (original) first set of consumer data.

As part of the first feature extraction process, the extracted features may be assigned an ID code or similar identifier, which may be used to reference elements of the sensitive information. For example, the ID codes may be used to assign labels to the extracted features for the generation of training data pairs.

At 606, method 600 includes training an AI/ML model to classify the reduced first set of consumer data into predetermined consumer categories. The consumer categories may be determined prior to training based on the marketing strategy. In various embodiments, the AI/ML model may be trained in accordance with method 300 of FIG. 3.

At 608, method 600 includes receiving a second set of consumer data from the data source. The second set of consumer data may be substantially similar to the first set of consumer data in structure and content. For example, the second set of consumer data may include similar types and amounts of consumer and/or customer data as the first set of consumer data. The second set of consumer data may include sensitive information, such as identifying information and/or financial/credit information of consumers or customers. As a result of including the sensitive information, the second set of consumer data may be prohibited from being stored on a server of the company, and the sensitive information may have to be removed from the second set of consumer data prior to processing the second set of consumer data. In some embodiments, the second set of consumer data may include consumer data of a single consumer, where the AI/ML model may be used to classify the single consumer into one of the predetermined consumer categories.

At 610, method 600 includes performing a second feature extraction process on the second set of consumer data to remove sensitive information and reduce the second set of consumer data to descriptive features. The second feature extraction process may be the same as or similar to the first feature extraction process applied to the first set of consumer data. As a result of applying the second feature extraction process to the second set of consumer data, a second reduced set of consumer data may be generated from the extracted features which may not include the sensitive information. However, the first reduced set of consumer data may include relationships or patterns between data points of the first reduced set of consumer data that also exist in data points of the (original) first set of consumer data. As with the first set of consumer data, ID codes may be assigned to the extracted features.

At 612, method 600 includes evaluating the features extracted from the second set of consumer data using the trained AI/ML model. In various embodiments, evaluating the extracted features may include classifying the extracted features into an appropriate category of the predetermined consumer categories. The feature classifications may then be used to classify the consumers of the second set of consumer data, for example, for targeted marketing campaigns. In other embodiments, the extracted features may be evaluated in a different manner.

In some embodiments, the output of the trained AI/ML model may be used to optimize promotional discounts (e.g., to maximize a likelihood of a consumer redeeming the offer while minimizing a monetary value of the discount), or to select an appropriate marketing campaign letter that is estimated to be well-received by the consumer based on their proximity to one or more locales (outdoor recreation sites, academic institutions, retail locations, etc.).

At 610, method 600 includes storing an output of the AI/ML model in a storage device such as a database (e.g., database 216 of FIG. 2), displaying the output of the AI/ML model on a display device (e.g., display device 234), and/or using the output of the AI/ML model in a different manner.

As one example of how the trained AI/ML model may be used, the extracted features may be classified into three categories. A first set of ID codes associated with a first set of extracted features classified into a first category of the three categories may be collected; a second set of ID codes associated with a second set of extracted features classified into a second category of the three categories may be collected; and a third set of ID codes associated with a third set of extracted features classified into a third category of the three categories may be collected. The first, second, and third sets of ID codes may be sent from data processing servers, where identifying information may be prohibited from being stored, to a server of a sales and marketing department, which may store the identifying information of consumers of the second set of consumer data. The first set of ID codes may be used to reference the identifying information of a first plurality of consumers of the second set of consumers; the second set of ID codes may be used to reference the identifying information of a second plurality of consumers of the second set of consumers; and the third set of ID codes may be used to reference the identifying information of a third plurality of consumers of the second set of consumers. A marketing team of the company may then target the first plurality of consumers with a notification of eligibility for a first gated offer; the team may target the second plurality of consumers with a notification of eligibility for a second, different gated offer; and the team may target the third plurality of consumers with a notification of eligibility for a third gated offer, where the third gated offer is different from both of the first and second gated offers.

In this way, targeted offers may be sent to different consumer groups, where consumers are classified into the different consumer groups by an AI/ML model that relies on reduced data comprising features extracted from raw consumer data to perform the classification, rather than the raw data itself, which may include sensitive information. The AI/ML model may be trained and deployed at a first location including data processing systems, and the raw consumer data may be stored at a second, different location including billing, sales and/or marketing information. In adherence with legal or regulatory guidelines, the sensitive information may be stored at the second location, but may not be stored at the first location. In various embodiments, the reduced data may also be stored, and used to retrain or refine the AI/ML model.

As a second example of how the trained AI/ML model may be used, the trained AI/ML model may receive consumer data of a single potential customer as input, and the AI/ML model may be used to determine an appropriate category of the predetermined consumer categories into which the single potential customer may be classified. For example, the single potential customer may go to a website of the company and may complete a form to determine whether the single potential customer may be eligible for a gated offer. When the form is processed, descriptive features may be extracted from the consumer data included in an HTTP request associated with the form, as described above in reference to FIG. 5. The extracted descriptive features may be inputted into the trained AI/ML model, and the trained AI/ML model may output the appropriate category of the single potential customer. Based on the appropriate category, the single potential customer may be notified of eligibility for one or more gated offers. In such a scenario, the consumer data of the single potential customer may not be stored, in adherence with legal and/or regulatory guidelines.

It should be appreciated that during training of the AI/ML model, a first size of the extracted feature data may be smaller than a second size of the raw data. By training the AI/ML model and performing the classification using the smaller extracted feature data rather than the larger raw data, an efficiency of the AI/ML model and the data processing systems may be increased, and a use of memory and processing resources of the data processing systems may be reduced. As a result of using the reduced memory and processing resources, the AI/ML model may be trained to analyze larger and/or more complicated/sophisticated consumer datasets than an alternative AI/ML model trained on raw consumer data or consumer data that has been anonymized in a different manner. Additionally or alternatively, the use of reduced memory and processing resources by the AI/ML model may result in more memory and processing resources being allocated to other tasks, increasing a functioning and overall performance of the data processing systems.

Additionally, as opposed to simply replacing sensitive information with generic tags, as may be common in other approaches, the methods described herein may generate descriptions of data including the sensitive information, where the descriptions may include non-sensitive information about the sensitive information that may be useful for training an AI/ML model. For example, rather than generating a first encoding with generic tags such as "{{FIRST_NAME}} {{LAST_NAME}} is an employee of {{COMPANY}}", using the methods described herein, a second, alternative encoding such as "first_name_present: true, last_name_present: true, national_identifier_present: false, date_of_birth_present: false, subject_is_member_of_topic: true" may be generated, where each of the Boolean values is an output of a feature extractor. An AI/ML model trained using data with the second, alternative encoding may achieve a performance equal to or greater than may be achieved using the first encoding. Further, the second encoding made in accordance with the methods described herein may generate encoded data of a smaller size than may be generated using the first encoding, which may allow the AI/ML model to be trained using less computing resources and in a shorter amount of time, reducing a cost of training the AI/ML model.

The technical effect of extracting features from raw data and training an AI/ML model to detect patterns in the extracted features rather than in the raw data, is that the training of the AI/ML model and use of the trained AI/ML model during an inference stage may be performed on data that does not include sensitive information, where an output of the trained AI/ML model may be used to perform operations on the raw data with a success rate similar to an AI/ML model trained on the raw data.

The disclosure also provides support for a method to verify consumer eligibility for gated offers, comprising: receiving data from a consumer including identifying information of the consumer, applying one or more feature extractors that transform the data from an input format to a proprietary intermediate digital format that reduces the data to descriptive features, the descriptive features not including the identifying information, evaluating the reduced data using a trained machine-learning (ML) model, the trained ML model trained on descriptive features extracted from similar consumer data, and sending an eligibility notification to the consumer based on a result of the evaluation. In a first example of the method, evaluating the reduced data using the trained ML model further comprises classifying the descriptive features into one of a plurality of predefined categories, and determining in real time at a point of sale whether the consumer is eligible for a gated offer based on the classification. In a second example of the method, optionally including the first example, the ML model is trained via a training procedure comprising: extracting descriptive features from a set of consumer data similar to the received data, assigning an identification (ID) code to the extracted descriptive features, labeling the descriptive features with ground truth labels, the ground truth labels correlated with the descriptive features using the ID code, and training the ML model on the labeled descriptive features. In a third example of the method, optionally including one or both of the first and second examples, the reduced data is a compressed, lower-dimension version of the data. In a fourth example of the method, optionally including one or more or each of the first through third examples, the identifying information includes one or more of: a name of the consumer, an address, phone number, and/or email of the consumer, an Internet Protocol (IP) address of the consumer, credit and/or financial information of the consumer, an identification number or code of the consumer, and an image of the consumer. In a fifth example of the method, optionally including one or more or each of the first through fourth examples, transforming the data from the input format to the proprietary intermediate digital format further comprises transforming the data in a non-invertible manner, where no inverse transformation exists that could generate the data in the input format from the reduced data in the proprietary intermediate digital format. In a sixth example of the method, optionally including one or more or each of the first through fifth examples, reducing the data to descriptive features further comprises converting the data into a one-dimensional or multi-dimensional vector of numerical values. In a seventh example of the method, optionally including one or more or each of the first through sixth examples, reducing the data to descriptive features further comprises filtering the converted data using one or more digital signal processing filters. In a eighth example of the method, optionally including one or more or each of the first through seventh examples, reducing the data to descriptive features further comprises computing descriptive statistics of the data. In a ninth example of the method, optionally including one or more or each of the first through eighth examples, the data includes image data, and reducing the image data to descriptive features further comprises reducing the image data to a frequency distribution of intensity values for a plurality of color channels of the image data. In a tenth example of the method, optionally including one or more or each of the first through ninth examples, the data includes an Internet Protocol (IP) message, and reducing the data to descriptive features further comprises generating a differential or summary output of data elements included in two or more fields of the IP message using one or more of precomputed lookup tables, public databases, and/or public registries. In a eleventh example of the method, optionally including one or more or each of the first through tenth examples, generating the differential or summary output of the data elements included in the two or more fields of the IP message further comprises determining a relationship between a first data element included in a metadata field of the IP message and a second data element included in a message field of the IP message, where either or both of the first data element and the second data element include plain text, HTML/XML, JSON, image, audio, and/or binary data. In a twelfth example of the method, optionally including one or more or each of the first through eleventh examples, determining a relationship between a first data element included in a metadata field of the IP message and a second data element included in a message field of the IP message further comprises calculating a physical distance between a first location indicated by an IP address of the IP message and a second location implied or stated in the message field of the IP message. In a thirteenth example of the method, optionally including one or more or each of the first through twelfth examples, the method further comprises: storing the reduced data, and retraining the ML model based on the reduced data.

The disclosure also provides support for a data anonymization system, comprising a processor and a non-transitory memory storing instructions that when executed, cause the processor to: receive data from a consumer including identifying information of the consumer, extract a set of descriptive features from the data, the descriptive features not including the identifying information, classify descriptive features of the set of descriptive features using a trained machine-learning (ML) model, and send a notification to the consumer based on the classification. In a first example of the system, further instructions are included in the non-transitory memory that are executed when extracting the set of descriptive features from the data, that cause the processor to perform one or more of: convert the data into a one-dimensional or multi-dimensional vector of numerical values, filter the data using one or more digital signal processing filters, calculate descriptive statistics of the data, reduce image data of the data to a frequency distribution of intensity values for a plurality of color channels of the image data, and generate a differential output of data elements included in two or more fields of an IP message of the data using one or more of precomputed lookup tables, public databases, and/or public registries, the differential output comprising a relationship between a first data element included in a metadata field of the IP message and a second data element included in a message field of the IP message. In a second example of the system, optionally including the first example, the reduced data is stored in a database of the data anonymization system. In a third example of the system, optionally including one or both of the first and second examples, the reduced data is transmitted between a data acquisition system of the data anonymization system and a data processing system of the data anonymization system.

The disclosure also provides support for a method for targeting potential customers with gated offers, comprising: receiving a set of consumer data including identifying information of a plurality of consumers, reducing the set of consumer data to a set of descriptive features, the descriptive features not including the identifying information, assigning each descriptive feature of the set of descriptive features an identification (ID) code, classifying the set of descriptive features into predetermined consumer categories using a trained machine-learning (ML) model, correlating the classified set of descriptive features with plurality of consumers using the ID codes assigned to the descriptive features, and sending one or more consumers of the plurality of consumers a notification of eligibility for a gated offer based on the classification. In a first example of the method, reducing the set of consumer data to a set of descriptive features includes one or more of: converting the data into a one-dimensional or multi-dimensional vector of numerical values, filtering the data using one or more digital signal processing filters, calculating descriptive statistics of the data, reducing image data of the data to a frequency distribution of intensity values for a plurality of color channels of the image data, and generating a differential output of data elements included in two or more fields of an IP message of the data using one or more of precomputed lookup tables, public databases, and/or public registries, the differential output comprising a relationship between a first data element included in a metadata field of the IP message and a second data element included in a message field of the IP message.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the models and operational data described herein are intended to include all such new technologies a priori.

As used herein, the singular form "a", "an" and "the" include plural references unless the context clearly dictates otherwise. For example, the term "a compound" or "at least one compound" may include a plurality of compounds, including mixtures thereof. The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments. It is appreciated that certain features of embodiments described herein, which are, for clarity, described in the context of separate embodiments, may also be provided in combination in a single embodiment. Conversely, various features of embodiments described herein, which are, for brevity, described in the context of a single embodiment, may also be provided separately or in any suitable sub-combination or as suitable in any other embodiment described herein. Certain features described in the context of various embodiments are not to be considered essential features of those embodiments, unless the embodiment is inoperative without those elements.

The invention claimed is:

1. A method to verify consumer eligibility for gated offers, comprising:
   - receiving data from a consumer including identifying information of the consumer, the data comprising one or more of plain text files, XML, JSON, or images;
   - applying one or more feature extractors comprising software subroutines that transform the data from an input format to a proprietary intermediate digital format that reduces the data to descriptive features in a non-invertible manner such that no inverse function exists that could generate the data in the input format from the reduced data in the proprietary intermediate digital format, wherein the descriptive features comprise a codification of relationships detected in the data and wherein the reduced data is a compressed, lower-dimension version of the data, the descriptive features not including the identifying information;
   - evaluating the reduced data using a trained machine-learning (ML) model, the trained ML model trained on descriptive features extracted from similar consumer data; and
   - sending an eligibility notification to the consumer based on a result of the evaluation.

2. The method of claim 1, wherein evaluating the reduced data using the trained ML model further comprises classifying the descriptive features into one of a plurality of predefined categories, and determining in real time at a point of sale whether the consumer is eligible for a gated offer based on the classification.

3. The method of claim 2, wherein the ML model is trained via a training procedure comprising:
   - extracting descriptive features from a set of consumer data similar to the received data;
   - assigning an identification (ID) code to the extracted descriptive features;
   - labeling the descriptive features with ground truth labels, the ground truth labels correlated with the descriptive features using the ID code; and
   - training the ML model on the labeled descriptive features.

4. The method of claim 1, wherein the codification includes non-sensitive information about the identifying information, the non-sensitive information including Boolean values.

5. The method of claim 1, wherein the identifying information includes one or more of:
   - a name of the consumer;
   - an address, phone number, and/or email of the consumer;
   - an Internet Protocol (IP) address of the consumer;
   - credit and/or financial information of the consumer;
   - an identification number or code of the consumer; and
   - an image of the consumer.

6. The method of claim 1, wherein reducing the data to descriptive features further comprises converting the data into a one-dimensional or multi-dimensional vector of numerical values.

7. The method of claim 6, wherein reducing the data to descriptive features further comprises filtering the converted data using one or more digital signal processing filters.

8. The method of claim 6, wherein reducing the data to descriptive features further comprises computing descriptive statistics of the data.

9. The method of claim 6, wherein the data includes image data, and reducing the image data to descriptive features further comprises reducing the image data to a frequency distribution of intensity values for a plurality of color channels of the image data.

10. The method of claim 1, wherein the data includes an Internet Protocol (IP) message, and reducing the data to descriptive features further comprises generating a differential or summary output of data elements included in two or more fields of the IP message using one or more of precomputed lookup tables, public databases, and/or public registries.

11. The method of claim 10, wherein generating the differential or summary output of the data elements included in the two or more fields of the IP message further comprises determining a relationship between a first data element included in a metadata field of the IP message and a second data element included in a message field of the IP message, where either or both of the first data element and the second data element include plain text, HTML/XML, JSON, image, audio, and/or binary data.

12. The method of claim 11, wherein determining a relationship between a first data element included in a metadata field of the IP message and a second data element included in a message field of the IP message further comprises calculating a physical distance between a first location indicated by an IP address of the IP message and a second location implied or stated in the message field of the IP message.

13. The method of claim 1, further comprising storing the reduced data, and retraining the ML model based on the reduced data.

14. A data anonymization system, comprising a processor and a non-transitory memory storing instructions that when executed, cause the processor to:
   - receive a first set of data from a plurality of consumers including identifying information of the consumers;
   - extract a first set of descriptive features from the first set of data by applying one or more feature extractors comprising software subroutines that transform the first set of data from an input format to a proprietary intermediate digital format in a non-invertible manner such that no inverse function exists that could generate the first set of data in the input format from the first set of descriptive features, wherein the first set of descriptive features comprises a codification of relationships detected in the first set of data, the first set of descriptive features not including the identifying information;
   - store the first set of descriptive features in a database of the data anonymization system, wherein the first set of descriptive features is a compressed, lower-dimension version of the first set of data that reduces a use of memory and processing resources of the data anonymization system relative to storing the first set of data;
   - train a machine-learning (ML) model on the first set of descriptive features by assigning identification (ID) codes to the first set of descriptive features, labeling the first set of descriptive features with ground truth labels correlated with the first set of descriptive features using the ID codes, and training the ML model on the labeled first set of descriptive features;
   - receive a second set of data from a consumer including identifying information of the consumer;
   - extract a second set of descriptive features from the second set of data by applying the one or more feature extractors to the second set of data;
   - classify the second set of descriptive features of the set of descriptive features using the trained machine-learning (ML) model; and send a notification to the consumer based on the classification.

15. The data anonymization system of claim 14, wherein further instructions are included in the non-transitory memory that are executed when extracting the first set of descriptive features from the first set of data, that cause the processor to perform one or more of:

convert the first set of data into a one-dimensional or multi-dimensional vector of numerical values;

filter the first set of data using one or more digital signal processing filters;

calculate descriptive statistics of the first set of data;

reduce image data of the first set of data to a frequency distribution of intensity values for a plurality of color channels of the image data; and generate a differential output of data elements included in two or more fields of an IP message of the first set of data using one or more of precomputed lookup tables, public databases, and/or public registries, the differential output comprising a relationship between a first data element included in a metadata field of the IP message and a second data element included in a message field of the IP message.

16. The data anonymization system of claim 14, wherein the first set of descriptive features is transmitted between a data acquisition system of the data anonymization system and a data processing system of the data anonymization system.

17. A method for targeting potential customers with gated offers, comprising:

receiving a first set of consumer data including identifying information of a first plurality of consumers;

reducing the first set of consumer data to a first set of descriptive features by applying one or more feature extractors comprising software subroutines that transform the first set of consumer data from an input format to a proprietary intermediate digital format, wherein the first set of descriptive features comprises a codification of relationships detected in the first set of consumer data, the first set of descriptive features not including the identifying information;

assigning each descriptive feature of the first set of descriptive features an identification (ID) code;

labeling the first set of descriptive features with ground truth labels, the ground truth labels correlated with the first set of descriptive features using the ID code;

training a machine-learning (ML) model on the labeled first set of descriptive features;

storing the first set of descriptive features in a reduced-dimensionality format, wherein the first set of descriptive features cannot be used to reconstruct the identifying information;

receiving a second set of consumer data including identifying information of a second plurality of consumers;

reducing the second set of consumer data to a second set of descriptive features by applying the one or more feature extractors to the second set of consumer data;

assigning each descriptive feature of the second set of descriptive features an ID code;

classifying the second set of descriptive features into predetermined consumer categories using the trained machine-learning (ML) model;

correlating the classified second set of descriptive features with the second plurality of consumers using the ID codes assigned to the second set of descriptive features; and sending one or more consumers of the second plurality of consumers a notification of eligibility for a gated offer based on the classification.

18. The method of claim 17, wherein reducing the first set of consumer data to a first set of descriptive features includes one or more of:

converting the first set of consumer data into a one-dimensional or multi-dimensional vector of numerical values;

filtering the first set of consumer data using one or more digital signal processing filters;

calculating descriptive statistics of the first set of consumer data;

reducing image data of the first set of consumer data to a frequency distribution of intensity values for a plurality of color channels of the image data; and generating a differential output of data elements included in two or more fields of an IP message of the first set of consumer data using one or more of precomputed lookup tables, public databases, and/or public registries, the differential output comprising a relationship between a first data element included in a metadata field of the IP message and a second data element included in a message field of the IP message.

* * * * *